US006418617B2

(12) United States Patent
Taylor

(10) Patent No.: US 6,418,617 B2
(45) Date of Patent: Jul. 16, 2002

(54) FUEL INJECTOR ASSEMBLY ASSEMBLY METHOD

(75) Inventor: Jimmy A. Taylor, Simpsonville, SC (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/789,223

(22) Filed: Feb. 20, 2001

Related U.S. Application Data

(62) Division of application No. 09/225,525, filed on Jan. 4, 1999, now abandoned.

(51) Int. Cl.[7] ............................ B21K 3/00; B23P 19/02

(52) U.S. Cl. ........................ 29/888.01; 29/254; 29/275; 29/525; 29/214

(58) Field of Search ........................ 29/888.01, 888.011, 29/255, 254, 275, 263, 213.1, 214, 525; 123/470, 509

(56) References Cited

U.S. PATENT DOCUMENTS

| | | | | | |
|---|---|---|---|---|---|
| 2,998,644 | A | * | 9/1961 | Thill | 29/275 |
| 3,092,902 | A | * | 6/1963 | Fowler | 29/275 |
| 3,165,949 | A | * | 1/1965 | Thill | 81/8.1 |
| 3,274,674 | A | * | 9/1966 | Hooper | 29/214 |
| 3,896,654 | A | * | 7/1975 | Mancini | 72/393 |
| 4,487,404 | A | * | 12/1984 | Martinez | 269/15 |
| 5,020,203 | A | * | 6/1991 | Rix | 29/255 |
| 5,299,346 | A | * | 4/1994 | Kilgore et al. | 29/33 K |
| 5,499,612 | A | * | 3/1996 | Haughney et al. | 123/470 |
| 5,657,733 | A | * | 8/1997 | Dozier et al. | 123/470 |
| 5,682,859 | A | * | 11/1997 | Wakeman | 123/470 |
| 5,819,411 | A | * | 10/1998 | Smith | 29/888.01 |

* cited by examiner

*Primary Examiner*—David P. Bryant
(74) *Attorney, Agent, or Firm*—Gordon H. Telfer

(57) ABSTRACT

Fuel injectors, for hydraulically actuated fuel systems with complex seals so high pressure oil can be confined, are assembled in an engine head with a tool that fits with part of the injector. Tool posts have ends that fit in holes of a bracket. The posts are configured to provide clearance from part of the injector above the bracket. The tool drives the injector in place when a surface of the tool is stuck. After using the tool to drive an injector in place, fasteners to secure the injector to the head are inserted through the bracket holes.

9 Claims, 5 Drawing Sheets

FUEL INJECTOR ASSEMBLY ASSEMBLY METHOD

This application is a division of U.S. Ser. No. 09/225,525, filed Jan. 4, 1999, now abandoned.

TECHNICAL FIELD

This invention relates to the assembly of fuel injectors in engine heads and particularly to a tool for driving into place an injector of a hydraulically actuated fuel injection system.

BACKGROUND ART

Direct injection of fuel into individual combustion chambers of a diesel engine is a common practice. One type of fuel system for direct injection is referred to as a hydraulically actuated electronic unit injection (or HEUI) fuel system. In a HEUI system, fuel injectors send fuel under high pressure (e.g., at pressures up to greater than 20,000 psi) into the respective engine cylinders. In contrast to other "mechanically actuated" (or MEUI) systems, a HEUI system includes a high pressure oil that acts in the injectors to elevate the fuel pressure from the low pressure it has before injection (e.g., about 60 psi) up to the injection pressure. A hydraulic oil supply pump is activated by a signal from an electronic control module (ECM) that controls a number of functions in the engine system.

HEUI system injectors formerly have been arranged with the high pressure oil entering the injector unit longitudinally, such as by a J tube that extends on top of an engine head. In such cases, the seals required for the injector to confine the fuel and the oil are relatively few (e.g., typically just two) and the injector unit has a configuration, including the seals, such that assembly by manually pushing the injector into an engine head has been convenient without a driving tool.

By way of further background, an injector for HEUI fuel systems that has allowed relatively easy hand insertion is shown and described in U.S. Pat. No. 5,499,612 by Haughney et al., which is incorporated herein by reference for its description relating to HEUI fuel systems. Such an injector is one that has an actuating fluid (e.g., engine oil) entering longitudinally into the injector body by way of a nonlinear line (sometimes referred to as a "J tube"). The J-tube carries actuating fluid from a high pressure rail through a clamping assembly that is external to the main portion of the engine head. Experience has shown the J tube can sometimes fail and disable an injector. Alternative head and injector designs have been developed to avoid having a J tube subject to such failure. In such more advanced designs the high pressure fluid reaches the injector body from the high pressure rail through a passage in the head itself.

Use of different injector configurations of improved performance or reliability can give rise to issues about more numerous and complex seals and resulting impracticality of simple hand insertion of injectors into an engine head.

SUMMARY OF THE INVENTION

The invention provides a tool for driving injectors into assembled positions in an engine head. The injectors may be ones that have relatively numerous seals such as injectors receiving high pressure fluid at a location transverse to their major axis. The tool, for example, includes a pair of posts extending from a base member with each post having an extremity (or nib) remote from the base member that fits in a respective aperture of a fuel injector. The tool also has a handle extending from the base member opposite the posts with a striking surface for applying a blow, such as by a mallet, to drive an injector, with its variously configured seals, into an aperture of the engine head.

A method of the invention uses the tool in steps including, for example, aligning the injector with the injector aperture in the head; fitting the posts into fastener holes on the injector, grasping the handle on the base member of the tool, striking the striking surface of the handle to drive the injector into place, removing the tool, and then inserting fasteners to fix the injector to the head.

The tool and method of the invention allow easy assembly of relatively complex fuel injectors including those where highly pressurized oil enters the injector transverse to its centerline and have a relatively large number (e.g. six) seals for maintaining adequate confinement of the fuel and oil, respectively. The invention also allows easy assembly where the injector unit must be fit into the head at an angle (e.g., about 10° or more from vertical) as is the case in some three-valve engine heads (i.e., two inlet air valves and one exhaust valve) or other heads where geometrical constraints impose a departure from vertical location of injectors.

These and other aspects of the invention will become more apparent from the following description.

DESCRIPTION INCLUDING PREFERRED EMBODIMENTS

Figure 1:
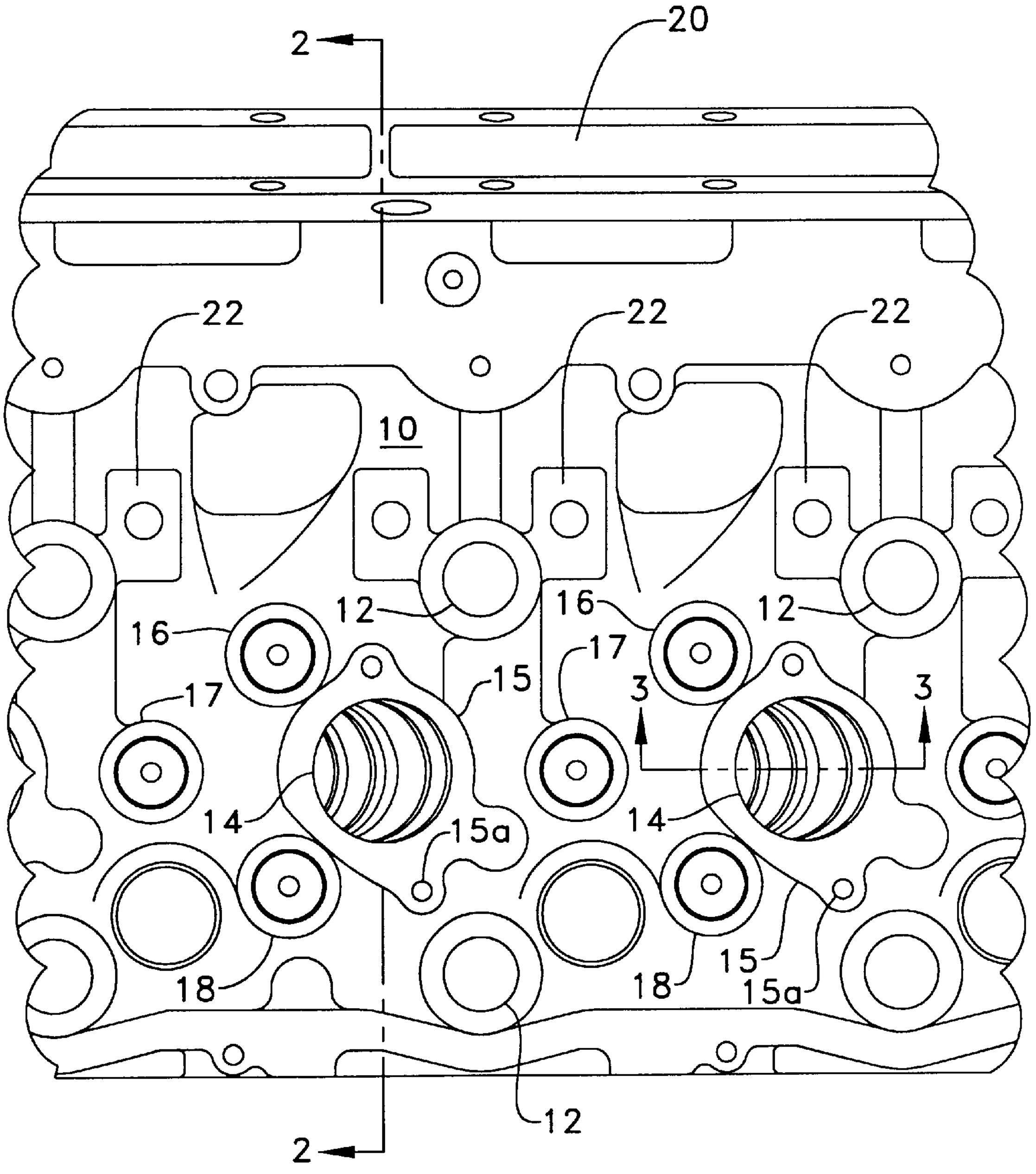
FIG. 1 is a partial plan view of an engine head.

Referring to FIG. 1, an example is shown of an engine head 10 of a type with which the injector assembly tool and method of the invention is beneficial. The engine head 10 is shown in a top view without fuel injectors in place and without a valve cover over the head. The head is secured to an engine block (not shown) by head bolts 12. The head and engine may have numbers of injectors and combustion cylinders chosen in accordance with past practice. For simplicity, the view includes part of a head including apertures 14 for two fuel injectors (sometimes referred to as "injector bores"). The head 10 is for an engine with a hydraulically activated fuel injection system, such as a HEUI system as discussed above in the background.

Injector bores 14 each enter the head from a top recess 15. At the base of recess 15 are fastener holes **15*a*** for eventual securing of an injector.

FIG. 1 also shows the locations of valves 16, 17 and 18 for each engine cylinder including two air intake valves 16 and 17 and one exhaust valve 18. Provision of three valves in the head 10, in contrast to former two valve heads, imposes some space constraints. One way of helping satisfy space requirements is to have the injector bores 14 at an angle. FIG. 1 also shows an air inlet 20 at the top of the block 10 and locations of rocker arms 22 for the valves 16, 17 and 18.

Figure 2:
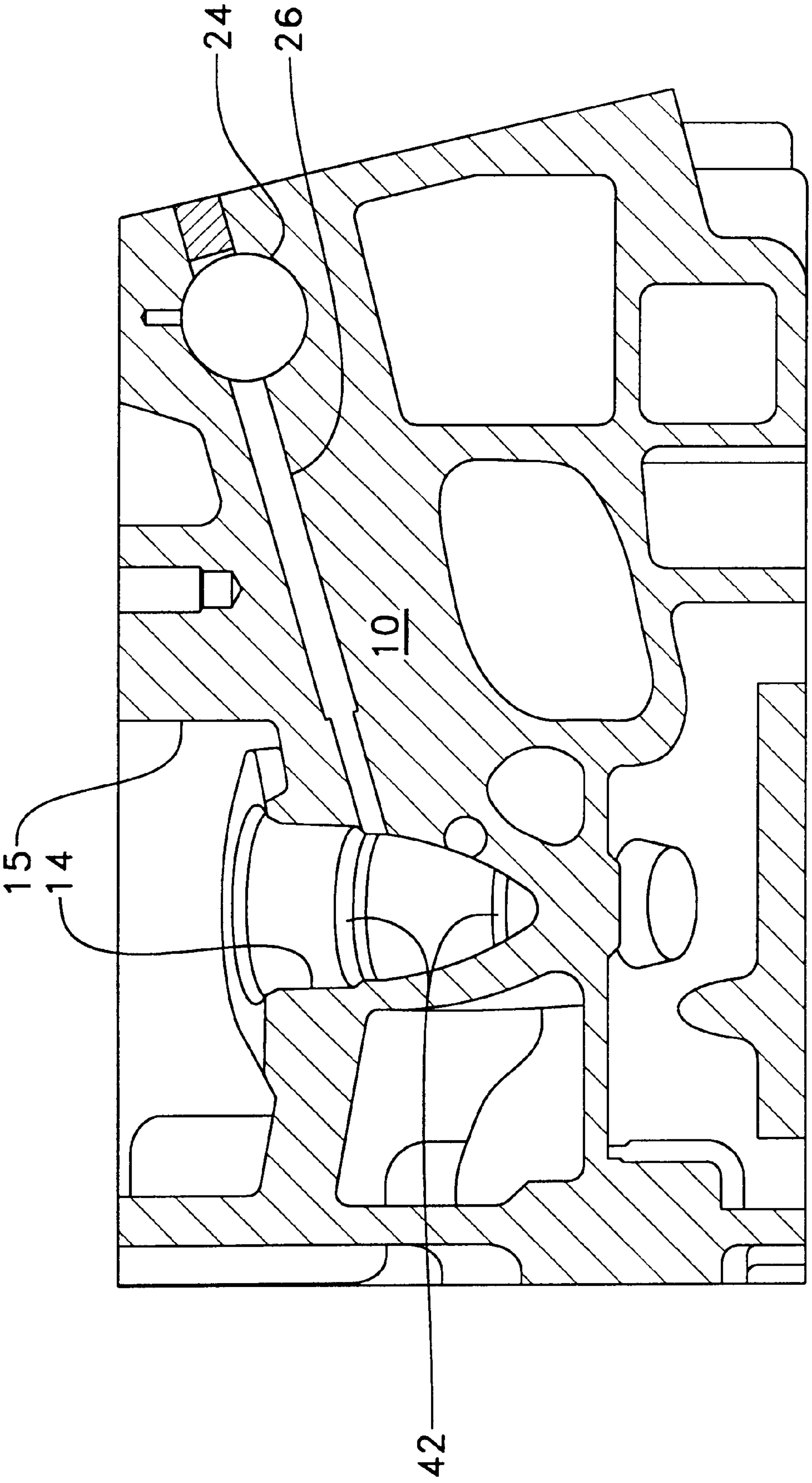
FIG. 2 is a sectional view along line 2—2 of FIG. 1.
Figure 3:
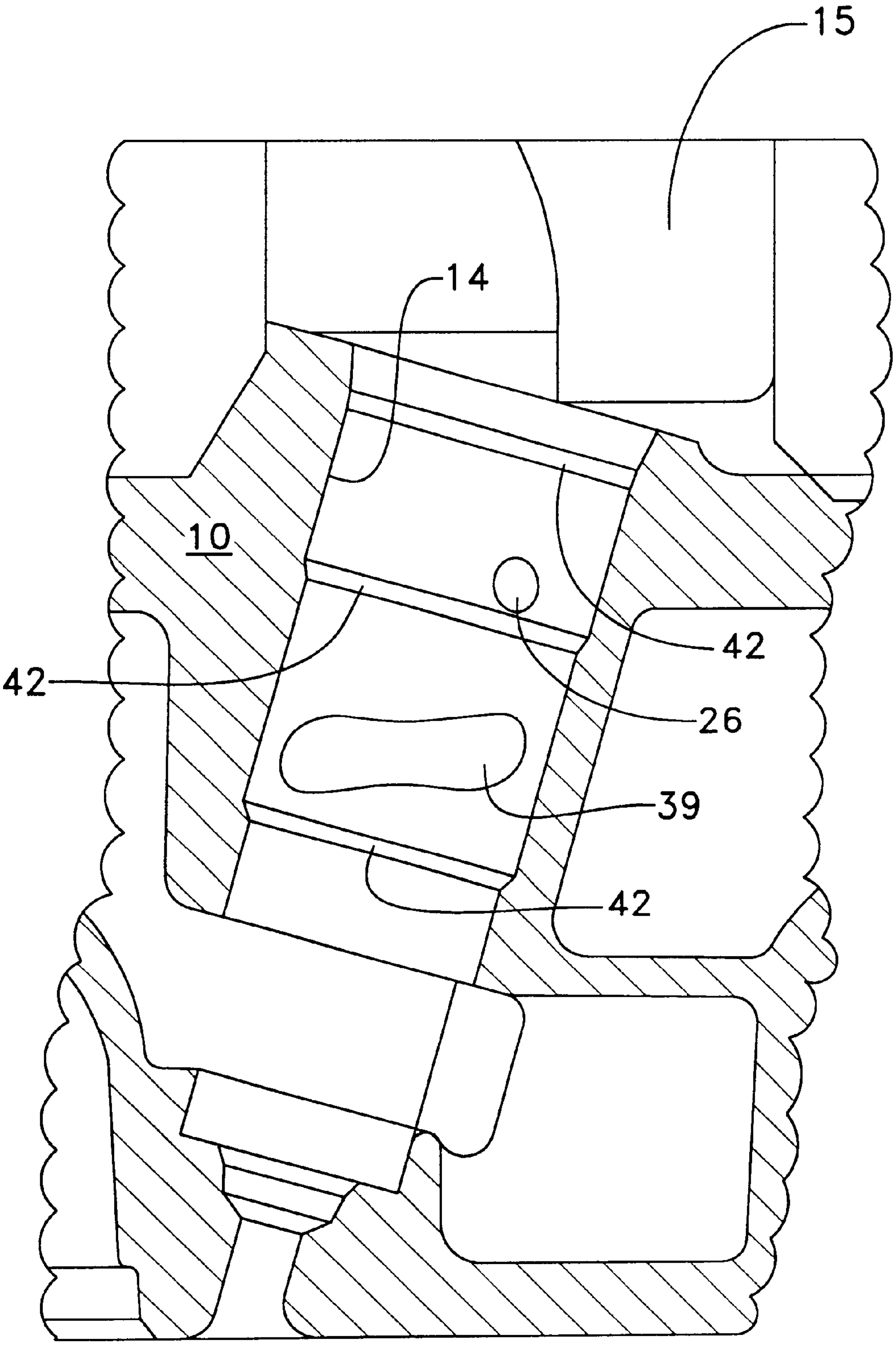
FIG. 3 is a sectional view along line 3—3 of FIG. 1.

FIG. 2 shows a section o the head 10 taken along line 2—2 of FIG. 1 and rotated clockwise 90°. FIG. 3 shows a section of the head 10 taken along line 3—3 of FIG. 1.

The three views illustrate aspects of the HEUI fuel system and head features that are designed to accommodate fuel injectors of a type the invention can advantageously be used with.

FIG. 2 shows one of the injector bores 14 in the head 10 and a high pressure rail 24 for actuating fluid (common to multiple injectors) and a passage 26 for high pressure fluid to the individual bore 14 shown. A description of the workings of a hydraulically actuated fuel injection system can be found elsewhere. Of present interest is that FIG. 2 shows, in contrast to above mentioned U.S. Pat. No. 5,499,612, that the block 10 has an internal passage 26 for high pressure fluid to enter bore 14 transverse to the bore axis, with no J tube or the like. This imposes more severe seal requirements to confine the actuating fluid. It is to be noted that FIG. 2 shows just part of an angled bore 14.

FIG. 3 further shows an injector bore 14. The location of the end of the high pressure passage 26 is shown and also the full extent of the bore 14 which is at an angle of about 15° to vertical.

Figure 4:
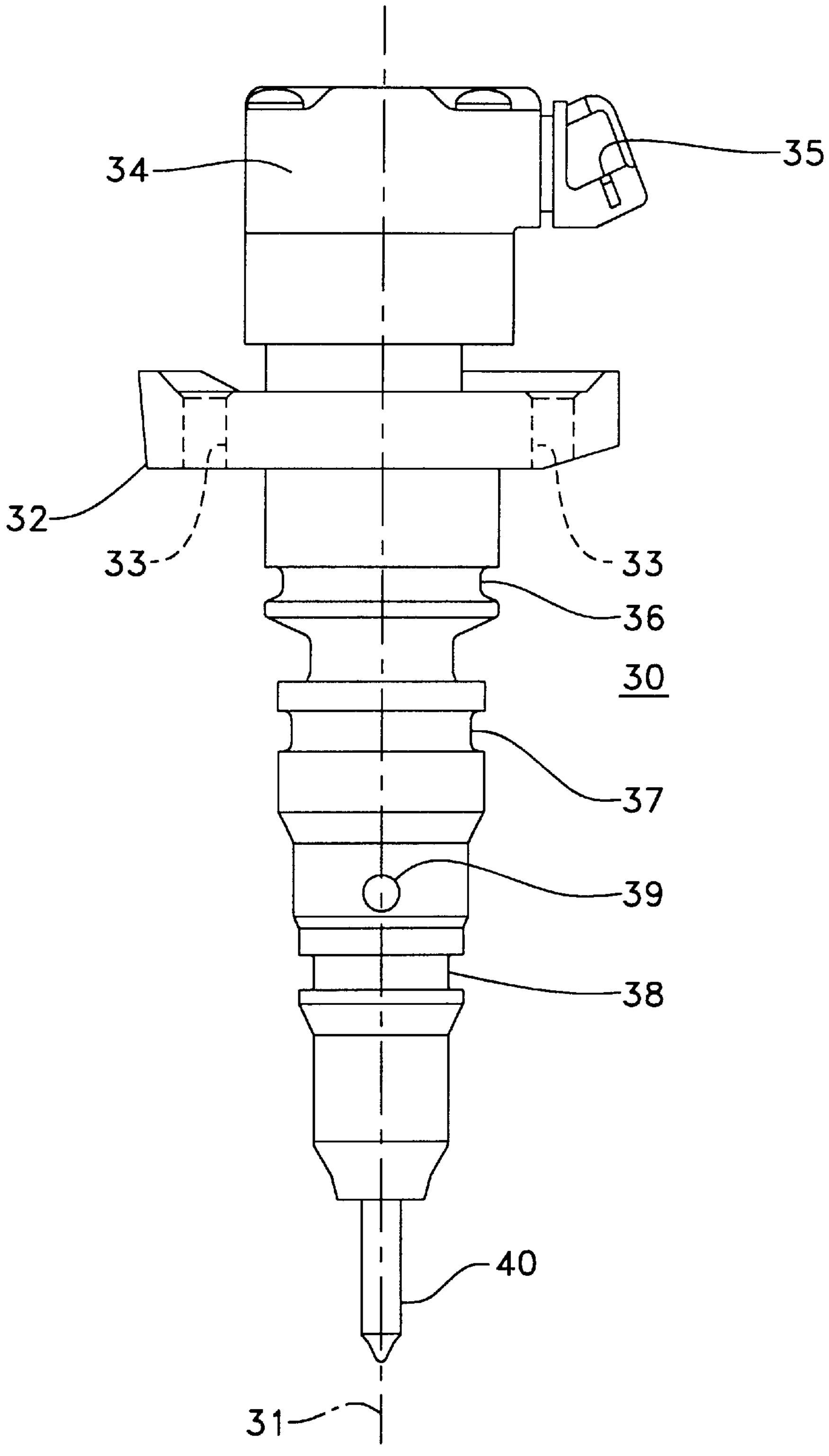
FIG. 4 is an elevation view of a fuel injector.

FIG. 4 shows an example of a fuel injector 30 that fits in each bore 14 of the head 10. The injector 30 includes a mounting bracket 32 that fits within the recess 15 in the head with alignment between a pair of bracket fastener holes 33 and head recess fastener holes 15*a*. When injector 30 is in place, fasteners through holes 33 and 15*a* secure it to the head 10.

Part of the injector 30 extends above the bracket 32 and that includes a solenoid 34 and switch (and wire harness) 35 that work in accordance with known practice for the injector to function. of particular interest here is that holes 33 are arranged so they can be accessed on lines that are straight and parallel to the injector axis 31 without blockage by parts 34 and 35.

Injector 30 has an exterior configuration so that when it is in place, the high pressure oil from passage 26 and the fuel being injected are adequately confined by seals including three sets of seals at locations 36, 37 and 38. For example, at seal location 36 there are to be three seal elements, two elastomer and one metal. At seal location 37 there are to be two elastomer seals. Between locations 36 and 37 is where the high pressure fluid from passage 26 enters. At seal location 38, there is to be one elastomer seal which , with seals at location 37, confine low pressure fuel. The fuel entering injector 30 through a fuel inlet orifice 39 is pressurized according to known practice of hydraulically actuated fuel injectors and then exits from nozzle 40. Seals per se are, for convenience, not shown in FIG. 4 but are annular elements extending out from the injector 30 at the indicated locations that bear against ridges, or other structural features, 42 within the head injector bore 14. The assembled unit must withstand huge pressure differences of thousands of pounds per square inch to confine the oil adequately. As a consequence of the injector and seal configuration, it is not practical to drive an injector 30 into a bore 14 by hand as was done with the injectors shown in the patent mentioned above.

Figure 5:
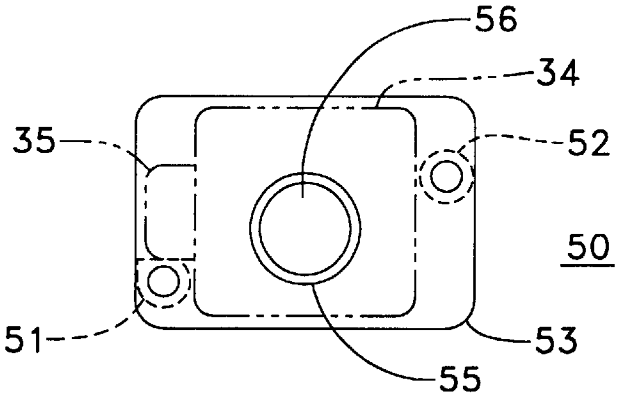
FIGS. 5 and 6 are, respectively, top plan and side elevation views of an injector driver tool.
Figure 6:
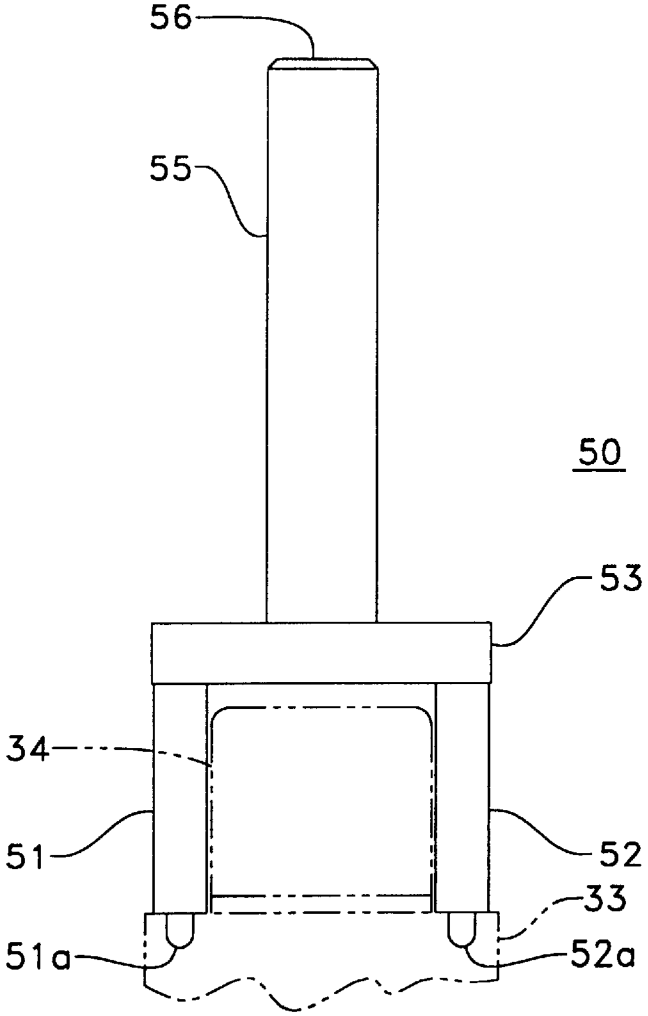

FIGS. 5 and 6 illustrate a tool 50 in accordance with the invention for driving injectors, such as injectors 30, into assembled position in the head 10. The tool 50 comprises a pair of posts 51, 52 extending from a base 53 with each post having an extremity, or nib, 51*a*, 52*a* remote from the base member that fits in a respective aperture 33 of the injector bracket 32. The tool 50 also has a handle 55 extending form the base 53 on the opposite side from the posts 51, 52. The handle has a striking surface 56 for applying a blow, such as by a mallet, to drive injector 30 into place in the bore 14.

Posts 51, 52 fit directly into fastener holes 33 without interference from any parts of the injector 30, such as parts 34 or 35. There is geometric flexibility in that the posts 51 and 52 need not be identical. In this example post 52 has a fully round cross-section in its major portion while post 51 has a flattened portion to permit it to pass by switch 35.

The posts 51, 52, base 53, and handle 55 may be individually made from hardened steel and assembled into a rigid unit assembly by welding.

The method of the invention comprises a number of manual operations that can be easily performed without special skills or exceptional strength of an operator. An injector 30, complete with seals at locations 36, 37, and 38, is placed in alignment with the bore 14. Generally, the injector 30 can be partly inserted until interference from the bore surface is felt. Then, the worker places the post nibs 51*a*, 52*a* in the bracket holes 33. The handle 55 is then held with one hand while striking surface 56 with a mallet, or other striking tool, held by the other hand. This drives the injector into correct position with its seals seated against bore features 42. Then the tool 50 is removed and fasteners are inserted through holes 33 and 15*a* to fix the injector 30 to the head 10.

It will be apparent that modifications can be made from the specific examples shown and described herein.

Among variations of the invention that can be suitable in certain applications are those in which the driver tool fits against the injector in some way other than having the ends 51*a*, 52*a* of the posts 51, 52 fitting into the bracket fastener holes 33. For example, there can be other holes for the tool posts to fit into, or there can be protuberances from the injector that fit into hollow cup ends of posts of the tool. Also, the tool can have a portion, other than posts, that fits against the injector. For example, a part such as a ring or partial ring that clears the solenoid 34 and switch 35 of the injector can fit against the bracket 32, or some other sturdy part of the injector, for driving in the injector 30 without having parts of the tool and injector fitting one inside the other.

INDUSTRIAL APPLICABILITY

The tool and method of the invention increase opportunities for varying injector configurations to improve performance and reliability. Now, assembly is facilitated and can be accomplished by a simple method without unusual operator skill or strength. In particular, one is able to more easily and quickly assemble engines having injectors of a HEUI fuel system of a type in which high pressure oil comes into the injector transverse to the direction of the injector axis and having a relatively complex seal arrangement.

What is claimed is:

1. A method of assembling a fuel injector with an engine head where the injector is one that is hydraulically actuated and has seals at a plurality of locations for confining fuel and for confining pressurized oil that enters the injector from a direction that is transverse to a center line of the injector, comprising the steps of:

aligning an injector with an injector aperture of an engine head;

placing a driver tool in a position on the injector, in which position one or more ends of one or more posts of the tool fit within respective apertures of the injector;

striking a striking surface of the tool to drive the injector into assembled position in the engine head aperture;

removing the tool from the injector after the injector is in the assembled position; and fastening the injector to the head after the removing of the tool.

2. The method of claim 1 wherein:

the placing of a driver tool in the position on the injector comprises manually placing ends of two posts of the tool into apertures that are injector mounting bracket apertures;

the striking of a striking surface of the driver tool comprises manually striking, with a striking tool, the striking surface of the driver tool which is located on a handle for placing the driver tool in position; and, the fastening of the injector to the head comprises manually inserting fasteners through the injector apertures into aligned apertures of the head.

3. The method of claim 2 wherein:

the aligning of an injector comprises manually locating the injector in alignment with the head injector aperture which has an axis departing from normal to the head.

4. A method of assembling a fuel injector within a bore in an engine head, where the injector is one that is hydraulically actuated and has seals at a plurality of spaced locations for confining fluids, comprising the steps of:

inserting the injector part way into the engine head bore until an interference with the bore surface is encountered;

placing a driver tool in a position on the part way inserted injector by locating extremities of two posts of the tool into respective mounting bracket apertures of the injector with the posts each having a portion that bears directly against an upper surface of the mounting bracket adjacent each of the apertures;

striking a surface of the driver tool, while holding the driver tool in the described position, with a striking tool separate from the driver tool to insert the injector within the bore to a location with the seals thereof seated against seal locations on the bore surface;

removing the driver tool from the injector after thus striking the driver tool; and, fastening the injector to the head after the removing of the driver tool by inserting fasteners through the mounting bracket apertures into aligned apertures of the head.

5. The method of claim 4 where:

the striking of the driver tool by the striking tool transmits an impact through integrally joined rigid parts of the driver tool directly to the mounting bracket.

6. The method of claim 4 where:

the placing of the driver tool in the position on the part way inserted injector includes orienting the tool with the extremities of the posts each located in specific ones of the mounting bracket apertures with a difference in shape of the two posts allowing the posts to avoid interference with parts of the injector before the extremities reach the mounting bracket apertures.

7. A method of assembling a fuel injector within a bore in an engine head, where the injector is one having an axis along which the components of the injector are located including a part with seals at spaced axial locations for confining fuel and for confining pressurized fluid for hydraulic actuation within the engine head bore and also including a mounting bracket with fastening portions for securing the injector to predetermined locations of the head and a solenoid located axially above and substantially within a lateral area defined by the mounting bracket, comprising the steps of:

manually inserting the injector part way into the engine head bore until an interference with the bore surface is encountered;

manually positioning a driving tool in mating engagement with the injector mounting bracket, the driving tool being one that has driver parts th at are positioned in the mating engagement with the bracket without interference with other injector components, the driving tool also being one with a handle in axial alignment with the injector axis when so positioned, the handle extending above the location of the injector solenoid and having a striking surface at its end;

manually striking the striking surface of the driving tool with a striking tool separate from the driving tool, while holding the handle with the tool in the described position, to insert the injector within the bore to a location with the injector seals seated against bore surface features;

manually removing the driver tool from the mounting bracket after the striking; and, securing the mounting bracket fastening portions to the predetermined locations of the head.

8. The method of claim 7 where:

the striking is performed after aligning the mounting bracket fastening portions with the predetermined locations of the head and, during the striking, impact from the striking tool passes axially through the tool handle, and through parts of the driver tool that are rigid and integrally joined together with the handle, directly to the mounting bracket, such parts of the driving tool including a base member transverse to the handle axis and a pair of extending members that pass on opposing sides of the injector solenoid from the base member to the mounting bracket.

9. The method of claim 8 where:

the positioning of the driving tool in mating engagement with the bracket and the holding of the handle with the tool so positioned are performed with the injector and the tool at an angle of at least about 10° from vertical to the head which is also the angle of the engine head bore.

* * * * *

UNITED STATES PATENT AND TRADEMARK OFFICE

CERTIFICATE OF CORRECTION

PATENT NO. : 6,418,617 B2
DATED : July 16, 2002
INVENTOR(S) : Jimmy A. Taylor

It is certified that error appears in the above-identified patent and that said Letters Patent is hereby corrected as shown below:

Title page,
Item [54], Title, please delete "FUEL INJECTOR ASSEMBLY ASSEMBLY METHOD" and insert -- FUEL INJECTOR ASSEMBLY METHOD --

Column 6,
Line 16, after "parts", delete "th at" and insert -- that --.

Signed and Sealed this

Twenty-ninth Day of October, 2002

*Attest:*

JAMES E. ROGAN

*Attesting Officer*

*Director of the United States Patent and Trademark Office*